United States Patent
Gauvin (10) Patent No.: US 8,555,357 B1
(45) Date of Patent: Oct. 8, 2013

(54) TECHNIQUES FOR MITIGATING FORGOTTEN PASSWORD ATTACKS

(75) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 28 days.

(21) Appl. No.: 13/250,626

(22) Filed: Sep. 30, 2011

(51) Int. Cl.
*G06F 21/00* (2013.01)

(52) U.S. Cl.
USPC .............................................. 726/6; 380/286

(58) Field of Classification Search
None
See application file for complete search history.

(56) References Cited

U.S. PATENT DOCUMENTS

2004/0210518 A1* 10/2004 Tiem ................................ 705/39
2010/0024042 A1* 1/2010 Motahari et al. ................ 726/26

OTHER PUBLICATIONS

Ahmadinejad et al., *"Inference Attacks by Third-Party Extensions to Social Network Systems,"* 3rd International Workshop on Security and Social Networking, pp. 355-360, Mar. 2011.

\* cited by examiner

*Primary Examiner* — Gilberto Barron, Jr.
*Assistant Examiner* — Malcolm Cribbs
(74) *Attorney, Agent, or Firm* — Wilmer Cutler Pickering Hale and Dorr LLP (57) ABSTRACT

Techniques for mitigating forgotten password attacks are disclosed. In one particular exemplary embodiment, the techniques may be realized as a method for mitigating forgotten password attacks comprising receiving an indication of a forgotten password communication for a user, identifying verification information associated with the forgotten password communication, determining a level of difficulty of inferring the verification information based on public information associated with the user, and calculating a level of risk associated with the verification information.

18 Claims, 4 Drawing Sheets

TECHNIQUES FOR MITIGATING FORGOTTEN PASSWORD ATTACKS

FIELD OF THE DISCLOSURE

The present disclosure relates generally to network security and, more particularly, to techniques for mitigating forgotten password attacks.

BACKGROUND OF THE DISCLOSURE

The use of social media sites such as Facebook™, Myspace™, Google™, LinkedIn, Yahoo™, and others is growing. Social media sites may allow users to post a large amount of information, including personal information, with the public and others. Social media sites may allow users to indicate relationships with other account users such as friends, relatives, co-workers, etc. Account users having a relationship with a first account user may have varying levels of access to the first account user's data. Social media sites may also serve as a platform for third party applications and may provide APIs and certain levels of access to account user data. Although a user may grant access to an application, the level of access that an application has may not be entirely clear to the user.

Users may forget a password to an account such as a social media site account, an email account, a financial account, or other accounts. An account provider may allow an account user to set up one or more questions which the account user may answer to gain access to an account when a password or other credential is forgotten. These forgotten password questions may be questions answerable by browsing public information associated with a user. For example, if a user has to provide a mother's maiden name to a financial account provider in order to reset a password, such information may be available and/or inferable from social media sites associated with the user. A user may have a relationship to a mother indicated on a social media site. The mother may in turn have a relationship to her brother indicated. By tracing a link of social media relationships to an uncle on the user's mother's side, the user's mother's maiden name may be identifiable.

As another example, a posting of a picture tagged "birthday" and also tagged with a user name and a date, may provide a user birthday. Such information may be available not only on a user's social media site, but also on the social media site of a friend or relative.

Thus, the information to identify answers to forgotten password questions may be identifiable via a user's social media data to hackers and others seeking access to user accounts.

In view of the foregoing, it may be understood that there may be significant problems and shortcomings associated with current technologies for mitigating compromised network security associated with forgotten password attacks.

SUMMARY OF THE DISCLOSURE

Techniques for mitigating forgotten password attacks are disclosed. In one particular exemplary embodiment, the techniques may be realized as a method for mitigating forgotten password attacks comprising receiving an indication of a forgotten password communication for a user, identifying verification information associated with the forgotten password communication, determining a level of difficulty of inferring the verification information based on public information associated with the user, and calculating a level of risk associated with the verification information.

In accordance with other aspects of this particular exemplary embodiment, the indication of a forgotten password communication may comprise a communication received by an account provider and calculating a level of risk may be performed by a system of at least one of: the account provider, a service provider, and a software vendor.

In accordance with further aspects of this particular exemplary embodiment, the indication of a forgotten password communication may comprise a communication received by the user and calculating a level of risk may be performed by a system of at least one of: the user, a service provider, and a software vendor.

In accordance with additional aspects of this particular exemplary embodiment, the techniques may further include determining whether a level of risk exceeds a specified threshold, and performing one or more actions in the event the level of risk exceeds a specified threshold.

In accordance with additional aspects of this particular exemplary embodiment, the one or more actions may comprise at least one of: warning a user, warning an entity requesting verification information, providing a rating of the calculated level of risk, providing an indication of public information used for inferring the verification information, blocking a forgotten password transaction associated with the forgotten password communication, and providing a suggested alternate verification request with a lower level of risk.

In accordance with additional aspects of this particular exemplary embodiment, the techniques may further include collecting public data associated with the user, and analyzing inferences available from public data.

In accordance with additional aspects of this particular exemplary embodiment, collecting public data may comprise scanning social media sites associated with an account of the user to identify public data useful for inferring verification information.

In accordance with additional aspects of this particular exemplary embodiment, public data useful for inferring verification information may includes at least one of: age, birthday, relationship to others, birthplace, education, gender, and anniversary date.

In accordance with additional aspects of this particular exemplary embodiment, collecting public data may include at least one of: comments by a user on a user's social media page, comments by others on a user's social media page, postings on a user's social media page, data shared by a user on their social media page, tags associated with multimedia on a user's social media page, and metadata embedded in multimedia on a user's social media page.

In accordance with additional aspects of this particular exemplary embodiment, metadata may comprise at least one of: date information associated with the multimedia, time information associated with the multimedia, and geolocation data information associated with the multimedia.

In accordance with additional aspects of this particular exemplary embodiment, collecting public data comprises: identifying a relationship between the user and a second user, and collecting data associated with the user from a social media page associated with the second user.

In accordance with additional aspects of this particular exemplary embodiment, public data associated with the user may be collected and inferences may be analyzed prior to receiving an indication of a forgotten password communication for the user.

In accordance with additional aspects of this particular exemplary embodiment, public data, inferences, and a level of difficult to determine such inferences may be stored in a database.

In accordance with additional aspects of this particular exemplary embodiment, the indication of a forgotten password communication may comprise a communication received by a plug-in to a web enabled application of the user and wherein the plug-in accesses the database to determine the calculated level of risk associated with the verification information.

In accordance with additional aspects of this particular exemplary embodiment, the plug-in may provide the calculated level of risk to the user allowing the user to select more secure forgotten password verification information.

In accordance with additional aspects of this particular exemplary embodiment, the plug-in may provide an indication of public information used for inferring the verification information to the user.

In accordance with additional aspects of this particular exemplary embodiment, the techniques may further include determining that the verification information has not been previously used for analyzing public information for inferences, collecting additional public data associated with the verification information, determining a difficulty of inferring the verification information based on additional public information associated with the user, and revising a calculated a level of risk associated with the verification information.

In accordance with additional aspects of this particular exemplary embodiment, the techniques may be realized as at least one non-transitory processor readable storage medium for storing a computer program of instructions configured to be readable by at least one processor for instructing the at least one processor to execute a computer process for performing the method as recited in claim 1.

In another particular exemplary embodiment, the techniques may be realized as an article of manufacture for mitigating forgotten password attacks, the article of manufacture comprising: at least one non-transitory processor readable storage medium, and instructions stored on the at least one medium, wherein the instructions are configured to be readable from the at least one medium by at least one processor and thereby cause the at least one processor to operate so as to: receive an indication of a forgotten password communication for a user, identify verification information associated with the forgotten password communication, determine a level of difficulty of inferring the verification information based on public information associated with the user, and calculate a level of risk associated with the verification information.

In yet another particular exemplary embodiment, the techniques may be realized as a system for mitigating forgotten password attacks comprising one or more processors communicatively coupled to a network, wherein the one or more processors are configured to: receive an indication of a forgotten password communication for a user, identify verification information associated with the forgotten password communication, determine a level of difficulty of inferring the verification information based on public information associated with the user, and calculate a level of risk associated with the verification information.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
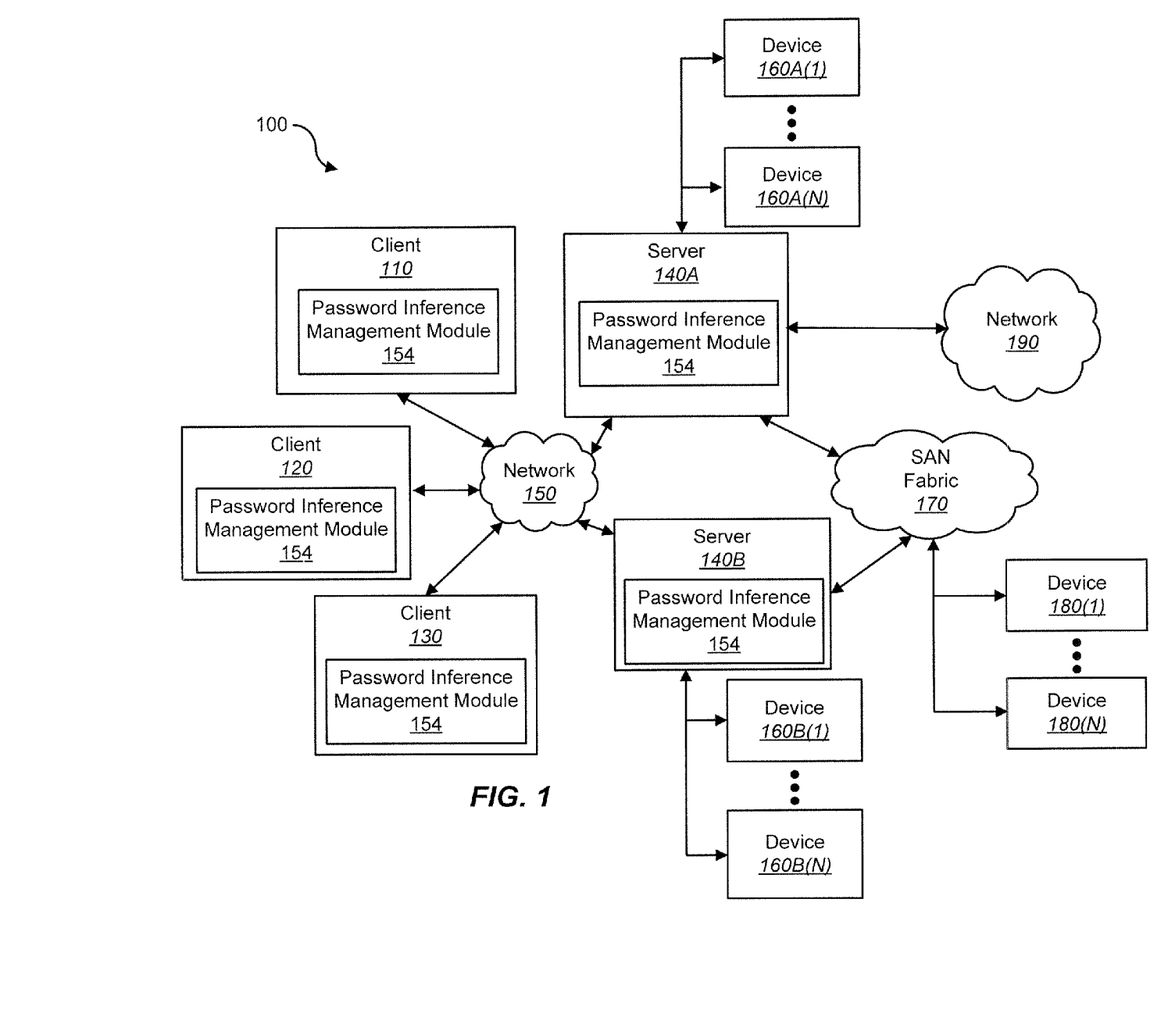
FIG. 1 shows a block diagram depicting a network architecture for mitigating forgotten password attacks in accordance with an embodiment of the present disclosure.

FIG. 1 shows a block diagram depicting a network architecture 100 for mitigating forgotten password attacks in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B (as well as client systems 110, 120, and 130, as described in more detail below) may contain a management module (e.g., password inference management module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
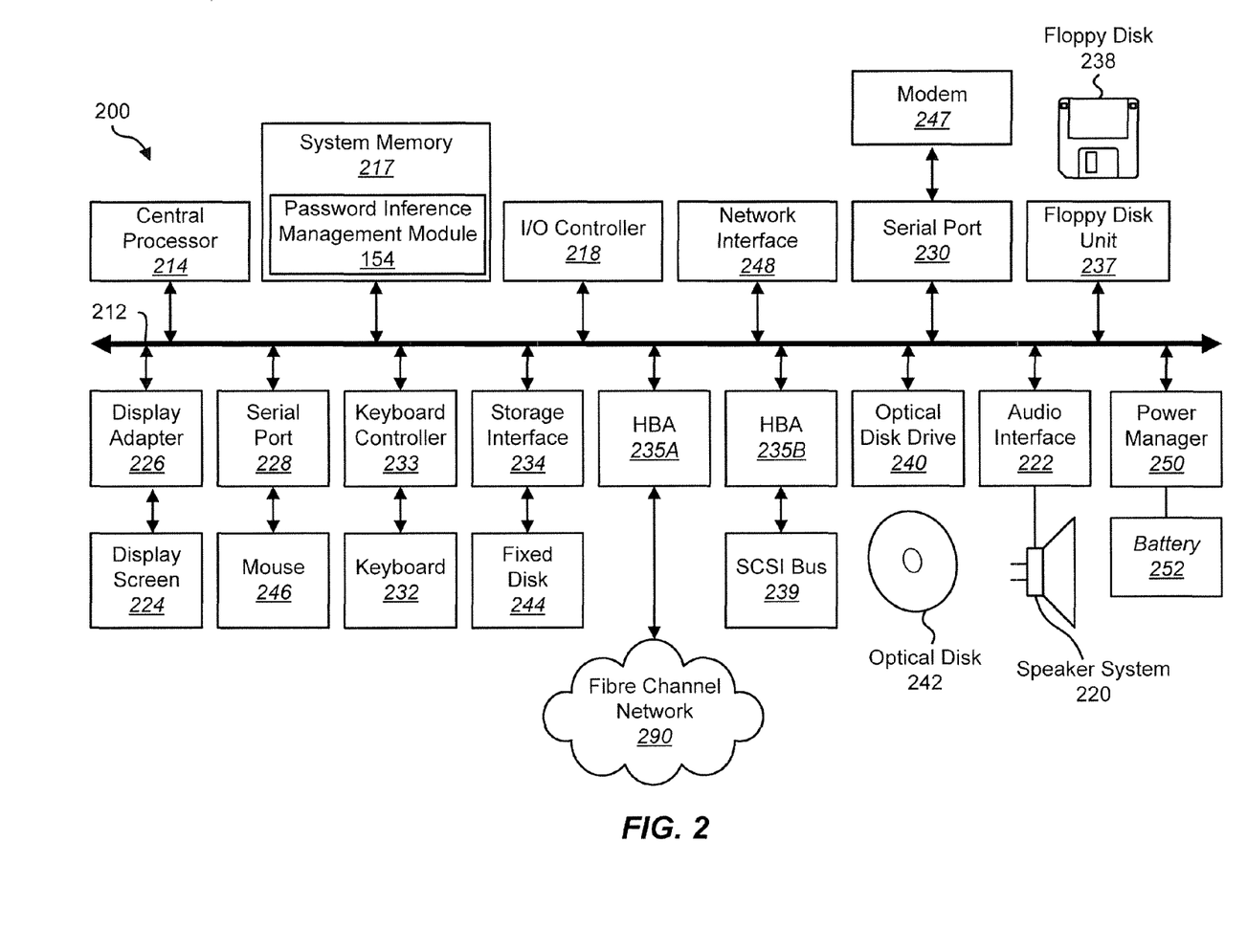
FIG. 2 depicts a block diagram of a computer system in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software. Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for mitigating forgotten password inference attacks such as, for example, password inference management module 154. As illustrated, one or more portions of password inference management module 154 may reside at a network centric location. For example, server 140A may be a server, a firewall, a gateway, or other network element that may perform one or more actions to reduce forgotten password inference attacks. According to some embodiments, network 190 may be an external network (e.g., the Internet) and server 140A may be a gateway or firewall between one or more internal components and clients and the external network.

Password inference management module 154 may collect data associated with a user that may be used to determine and/or infer an answer to a security question by an account provider. Account providers such as, for example, financial institutions, stores, employer websites, social media sites, and other websites, may prompt a user to answer a security question to increase security. For example, if a user forgets a password, the user may request a password hint, a password reset, or the password itself from an account provider. The account provider may provide a security question that a user has to answer in order to reset their password, receive their password, and/or obtain a password hint. An account holder may be asked to choose one or more security questions and to provide answers to the chosen security questions when the account holder creates or configures their account. The questions may be designed to fit a large number of users and may have common themes (e.g., family information such as mother's maiden name, educational information such as high school name, birthplace, anniversary, etc). Security questions provided by an account holder may also be used in other situations. For example, if an account provider detects an account holder attempting to access an account from an unusual network address or a network address having a bad reputation (e.g., a domain or territory associated with hackers or fraud or a foreign territory for an account holder with no travel history), the account provider may prompt a user with a security question in order to provide additional security. Security questions may also be issued by an account provider based on a determination that additional security may be needed. For example, an account holder may prompt a user with a security question if an account provider detects a certain number of failed login attempts prior to a successful login, a transaction meeting specified criteria (e.g., above a threshold, not in accordance with a user profile, transferring funds to a suspect entity, etc.), or if an account holder receives a complaint associated with an account. Password inference management module 154 may identify vulnerabilities in a security question provided in one or more of these or other situations and provide a responsive action.

Password inference management module 154 may contain one or more components. According to some embodiments, functionality may be distributed across a plurality of locations. For example, password inference management module 154 on clients 110, 120, and 130 may be a module directed towards monitoring user communications for forgotten password communications. Password inference management module 154 on server 140A may scan public data associated with one or more users and may analyze inferences available from public data. Parsing of forgotten password communications to extract requested forgotten password verification information may occur on clients 110, 120, and 130, on server 140A or at another location. Analysis of risk of requested information may occur on clients 110, 120, and 130, on server 140A or at another location. Responsive actions performed may be implemented at clients 110, 120, and 130, on server 140A or at another location.

Password inference management module 154 may scan and/or receive public data associated with a user. Scanning social media sites may include scanning sites associated with account of the user to identify public data useful for inferring verification information. For example, social media sites may include Facebook™, Myspace™, Google™, LinkedIn™, Yahoo™, Flickr™ and others. Password inference management module 154 may crawl such sites obtaining data associated with a user. Data useful for inferring verification information may include age, birthday, relationship to others, birthplace, education, gender, anniversary date, and other personal user data. Password inference management module 154 may collect information that is posted directly by a user on their account space associated with a social media site (e.g., their education section of LinkedIn™, their wall on Facebook™, their profile on Yahoo™, postings, comments, etc.). Such postings may explicitly state some information that may be used to determine answers to a security question or may provide information useful for inferring an answer. According to some embodiments, password inference management module 154 may crawl publicly available information. According to some embodiments, password inference management module 154 may be provided access to social media data of a user by one or more APIs, by a data export, or by other data sharing methods (e.g., backup media).

According to one or more embodiments, password inference management module 154 may be provided with different levels of access to gather data. For example, social media sites may be hosts for third party applications which may have access levels to user data greater than the public. A user may install and/or consent to access by an application to user data which provides greater public access to a user's data either intentionally or unintentionally (e.g., a chat application or a photo sharing application). According to some embodiments, password inference management module 154 may be provided with an access level of an entity to which an account holder has granted access such as, for example, a friend, a connection, a contact, etc.

According to some embodiments, password inference management module 154 may gather user or account holder relationship information and collect online information from other users having a relationship with a user. For example, password inference management module 154 may traverse a friends list, a contacts database, a listing of connections, or other relationships to collect data from pages associated with those other users (e.g., a spouse may have posted an anniversary date that may be used in a security question, a friend or relative may have a calendar reminder with a user birthday).

Data collected by password inference management module 154 may include comments by a user on a social media page, comments by others on a social media page, postings on a social media page, data shared by a user on a social media page, tags associated with multimedia on a social media page (e.g., tags associated with photos), and metadata embedded in multimedia on a social media page. This data may be on a user's own page or account space or on a page associated with a second user with whom the first user has a relationship (e.g., listed in contacts of the user, on a friends list of the user, etc.). Metadata embedded in multimedia on a social media page may include date information associated with the multimedia, time information associated with the multimedia, geolocation data information associated with the multimedia, or other embedded metadata.

Password inference management module 154 may also analyze data for inferences. For example, a user's profile may be scanned to identify relationships. The profile of a user's mother may be scanned by to identify a brother or father of the user's mother (i.e., a maternal uncle or grandfather). The maternal uncle or grandfather may indicate a mother's maiden name which may be a security question of an account of the user. The maternal uncle, maternal grandfather, or other relation of the mother may be identified by associated relationships on the mother's web page (e.g., friends list, connections, etc.), by tagged family photos, or other data on the mother's web page. In another example, a classmate's web page may be crawled and information about a user's high school may be obtained from the classmate's web page from a tagged photo or a posting about reunion information. Birthdays, anniversaries, and other dates may be collected from calendar data of a user, a friend, or a relative. Metadata associated with a posting or comment may provide additional information. For example, a posting on a wall saying "Happy Birthday" may be accompanied by a posting date and may be on a page of a user whose birthday it is. In some embodiments, password inference management module 154 may analyze multimedia and other files for embedded multimedia that may be used for inferences. For example, some cameras (including some cell phone cameras) may embed metadata such as a date and time an image was taken, geolocation data, camera attributes, and other metadata. An image tagged wedding on a user's page may indicate a place, a date, and a time of a wedding of a user. This may provide an anniversary date which may be a security question answer. Similarly, graduation dates, schools graduated from, school locations and other data may be obtained from metadata associated with photos.

According to some embodiments, password inference management module 154 may collect user associated data, analyze inferences, and store data and analyzed inferences. For example, password inference management module 154 may store collected user data in electronic storage such as, for example devices 160 and/or SAN storage on devices 180. Password inference data may be stored in a database or other data structure and indexed, filtered, sorted or otherwise processed. Analysis of inferences may include a rating of vulnerability of a particular piece of information. For example, a birthday which is posted on a user's social media site may be rated as vulnerable or as a weak basis for a security question. Ratings may be provided as weightings or numerical indicators of strength or weakness of a security question based on available data, a difficulty of inferring the answer to the security question, a frequency of inference attacks against a particular security question or security question type, a success rate of inference attacks against a particular security question or security question type, and other factors.

Password inference management module 154 may collect or refresh data periodically (e.g., daily at off-peak hours, weekly, monthly, etc.). According to some embodiments, certain events may trigger a collection of data. For example, password inference management module 154 may include a component or agent running on a user device (e.g., a plug-in to a browser). Actions such as updating a profile may trigger a collection of data for a user. According to some embodiments, collections of data may be focused on collecting data associated with a user selected security question. For example, if a user has chosen as a security question "High School Mascot", a posting such as a photo tagged "mascot" may trigger a collection and analysis of data.

According to one or more embodiments, data collection and/or analysis may be integrated with backup of data. An initial collection of data may be performed using a full backup of data. For example, an initial collection of user profile data may be performed using backups of a social media provider who may offer a security analysis of posted data as a service or who may partner with a vendor or security provider. Supplemental collections of data may be performed using incremental backups. A security solutions provider may partner with a plurality of social media sites to collect and analyze user data (e.g., as a security service to users who consent). Analysis of backed up data may focus on backups of only data which is publicly available or available to applications on a social media platform (e.g., backed up private data may not be analyzed for inference attack vulnerabilities).

Password inference management module 154 may collect data associated with a user at one or more times. For example, password inference data may collected prior to a user picking a password security question (e.g., prior to account configuration time). This may allow an account provider such as a financial institution to determine which security questions a user may pick. It may also indicate that an account provider should require a plurality of questions or other forms of verification for a particular user, based on data available for that user.

Collected and stored data may be utilized whenever a security question is used. For example, if a user requests a forgotten password, resetting of a password, or a password hint, password inference management module 154 may detect the request. Password inference management module 154 may analyze a security question to determine the strength of the question based on collected password inference data. If password inference management module 154 is implemented at an account provider side, the account provider may use indications of the strength of forgotten password questions to determine which of the questions previously answered by a user to ask for verification. If all of the questions previously answered by the user (e.g., the account holder at account setup time) are determined to be weak, additional security measures may be taken or the forgotten password request may be denied. For example, the account provider may display a message and a number to call for further assistance. If password inference management module 154 is implemented at a user side (e.g., as a plug-in to a browser), the plug-in may parse a received forgotten password question and query password inference data to determine the strength or security of the question. If the security question is determined to be weak based on analyzed collected data, the user may be warned and may opt for another question if available or may decline to answer the question (e.g., contact the account provider instead). Other events may trigger the analysis of security questions to identify vulnerabilities. For example, if an account provider detects a certain number of failed login attempts prior to a successful login, a security question may be provided subsequent to login in order to access an account. Available security questions may be analyzed in order to provide a security question whose answer may not be easily inferred from the collected data. Other events which prompt a security question may also prompt analysis of the security question by an account provider or a user. For example, detection by an account provider of a transaction meeting specified criteria (e.g., above a threshold, not in accordance with a user profile, transferring funds to a suspect entity, etc.) may trigger a security question and analysis of that security question. Similarly, detection of an access attempt from a suspicious network address may trigger a security question and analysis of that security question.

According to some embodiments, password inference management module 154 may be implemented at a gateway or a firewall. For example, server 140A may be a gateway to network 190 which may be the Internet. Server 140A may monitor communications for forgotten password transactions and may provide an indication of the strength or weakness of forgotten password question.

According to some embodiments, password inference management module 154 may provide an indication of public information used for inferring the verification information to the user. For example, if a user receives a warning that a security question is weak, they may be able to click on an icon or other interface control requesting clarification. A user may learn that their birth date information, education information, or other information is available on a particular social media site (e.g., via a summary page and/or a link to a source of collected data). In some embodiments, information about a social media site's use of data of a third party application's use of data may be provided (e.g., reputation or security information of a genealogy application, a photo sharing application, or other application for a social media site may be provided).

According to some embodiments, an account user, an account provider, or another entity may be able to initiate collection, analysis, and/or risk evaluation of security verification information (e.g., forgotten password questions) associated with one or more accounts.

FIG. 2 depicts a block diagram of a computer system 200 in accordance with an embodiment of the present disclosure. Computer system 200 is suitable for implementing techniques in accordance with the present disclosure. Computer system 200 may include a bus 212 which may interconnect major subsystems of computer system 200, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 200 may be stored on and accessed via a computer readable medium, such as a hard disk drive (e.g., fixed disk 244), an optical drive (e.g., optical drive 240), a floppy disk unit 237, or other storage medium. For example, password inference management module 154 may be resident in system memory 217.

Storage interface 234, as with the other storage interfaces of computer system 200, can connect to a standard computer readable medium for storage and/or retrieval of information, such as a fixed disk drive 244. Fixed disk drive 244 may be a part of computer system 200 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 200 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
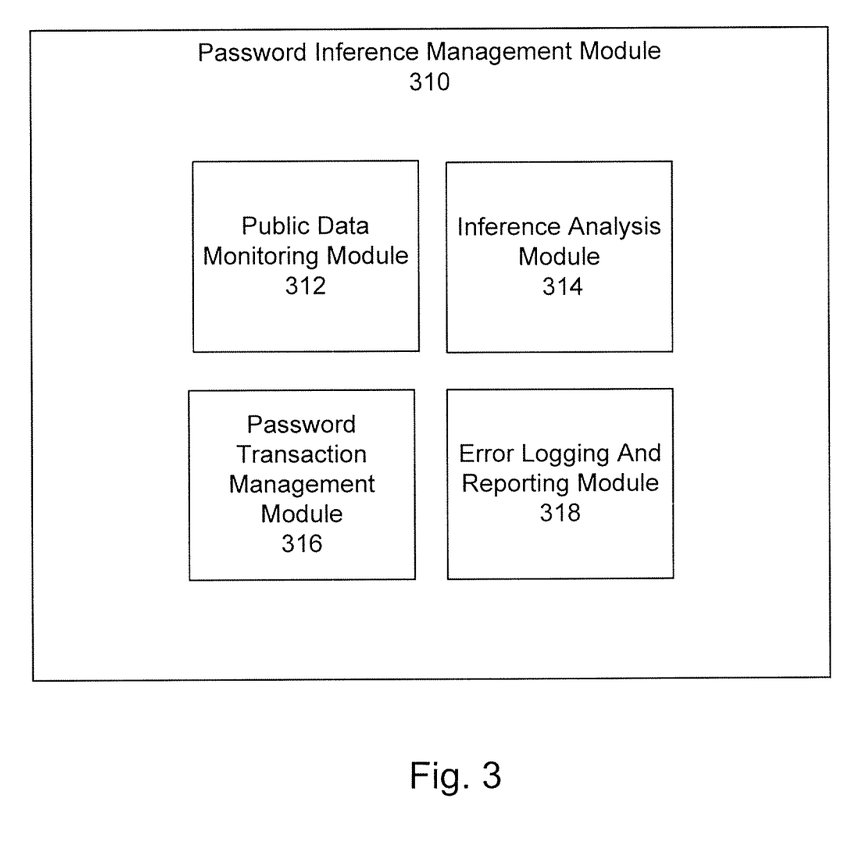
FIG. 3 shows a module for mitigating forgotten password attacks in accordance with an embodiment of the present disclosure.

Referring to FIG. 3, there is shown a password inference management module 310 in accordance with an embodiment of the present disclosure. As illustrated, the password inference management module 310 may contain one or more components including public data monitoring module 312, inference analysis module 314, password transaction management module 316, and error logging and reporting module 318.

The description below describes network elements, computers, and/or components of a system and method for mitigating forgotten password attacks that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Public data monitoring module 312 may scan and/or receive data associated with a user. Scanning social media sites may include crawling sites associated with account of the user to identify public data useful for inferring verification information. For example, social media sites may include Facebook™, Myspace™, Google™, LinkedIn™, Yahoo™, Flickr™ and others. Public data monitoring module 312 may crawl such sites obtaining data useful for inferring verification information including birthday, relationship to others, birthplace, education, gender, anniversary date, and other personal user data. Public data monitoring module 312 may collect information that is posted directly by a user on their account space associated with a social media site. Such postings may explicitly state some information that may be used to determine answers to a security question or may provide information useful for inferring an answer. Public data monitoring module 312 may also crawl pages and/or profiles of friends and/or connections associated with a user (e.g., on a friends list, a contacts list, a connections list, etc.). According to some embodiments, public data monitoring module 312 may be provided access to social media data of a user by one or more APIs, by a data export, or by other data sharing methods (e.g., backup media).

According to one or more embodiments, Public data monitoring module 312 may be provided with different levels of access to gather data. For example, social media sites may be hosts for third party applications which may have access levels to user data greater than the public. A user may install and/or consent to access by an application to user data which provides greater public access to a user's data either intentionally or unintentionally (e.g., a chat application or a photo sharing application). Public data monitoring module 312 may be provided with an access level of an entity to which an account holder has granted access such as, for example, a friend, a connection, a contact, etc.

Data collected by public data monitoring module 312 may include comments by a user on a social media page, comments by others on a social media page, postings on a social media page, data shared by a user on a social media page, tags associated with multimedia on a social media page (e.g., tags associated with photos), and metadata embedded in multimedia on a social media page. This data may be on a user's own page or account space or on a page associated with a second user with whom the first user has a relationship.

Inference analysis module 314 may analyze data for inferences. For example, a user's profile may be scanned to identify relationships. The identified relationships may allow inferences about a maiden name, a birthplace, and other information. Birthdays, anniversaries, and other dates may be collected from data of a user, a friend, or a relative. Metadata associated with a posting or comment may provide additional information. For example, a posting on a wall saying "Happy Birthday" may be accompanied by a posting date and may be on a page of a user whose birthday it is. In some embodiments, inference analysis module 314 may analyze multimedia and other files for embedded multimedia that may be used for inferences. Anniversary dates, names of best men or maids of honor, graduation dates, schools graduated from, school locations and other data may be obtained from metadata associated with photos.

Password transaction management module 316 may determine the strength or weakness of a security question. Password transaction management module 316 may provide a rating of the strength of a password security question to a user, an account provider, or another authorized party. Password transaction management module 316 may use data collected by public data monitoring module 312 and analyzed by inference analysis module 314. For example, if a user requests a forgotten password, resetting of a password, or a password hint, password transaction management module 316 may detect the request. Password transaction management module 316 may analyze a security question to determine the strength of the question based on collected password inference data. If password transaction management module 316 is implemented at an account provider side, the account provider may use indications of the strength of forgotten password questions to determine which of the questions previously answered by a user to ask for verification. If all of the questions previously answered by the user (e.g., the account holder at account setup time) are determined to be weak, additional security measures may be taken or the forgotten password request may be denied. For example, the account provider may display a message and a number to call for further assistance. If password transaction management module 316 is implemented at a user side (e.g., as a plug-in to a browser), the plug-in may parse a received forgotten password question and query password inference data to determine the strength or security of the question. If the security question is determined to be weak based on analyzed collected data, the user may opt for another question if available or may decline to answer the question (e.g., contact the account provider instead). Other events may trigger the analysis of security questions to identify vulnerabilities. For example, if an account provider detects a certain number of failed login attempts prior to a successful login a security question may be provided subsequent to login in order to access an account. Available security questions may be analyzed in order to provide a security question whose answer may not be easily inferred from the collected data.

According to some embodiments, one or more modules of password inference module 154 may track security questions used to analyze collected data. If a security question is detected for which associated data has not been collected and/or analyzed, additional collection and/or analysis may be triggered. According to some embodiments, analysis of data may occur at an authorized third party such as, for example, a security solution provider or a software vendor. Detection of a previously unused security question (e.g., by a browser plug-in on a user device or by an implementation at an account provider) may result in the question being forwarded to the authorized third party. Receipt of a new security question may result in refinement of algorithms to collect data, generate inferences, and evaluate the strength of security questions. Updates of code used to collect security data, analyze security data, generate inferences, detect security questions, and provide responses may be distributed (e.g., a security solution subscriber may receive an update). Other conditions may trigger an update such as extensions to social media formats, websites, and the addition of social media sites. Error logging and reporting module 318 may produce logs, reports, or other information associated with mitigating forgotten password attacks.

Figure 4:
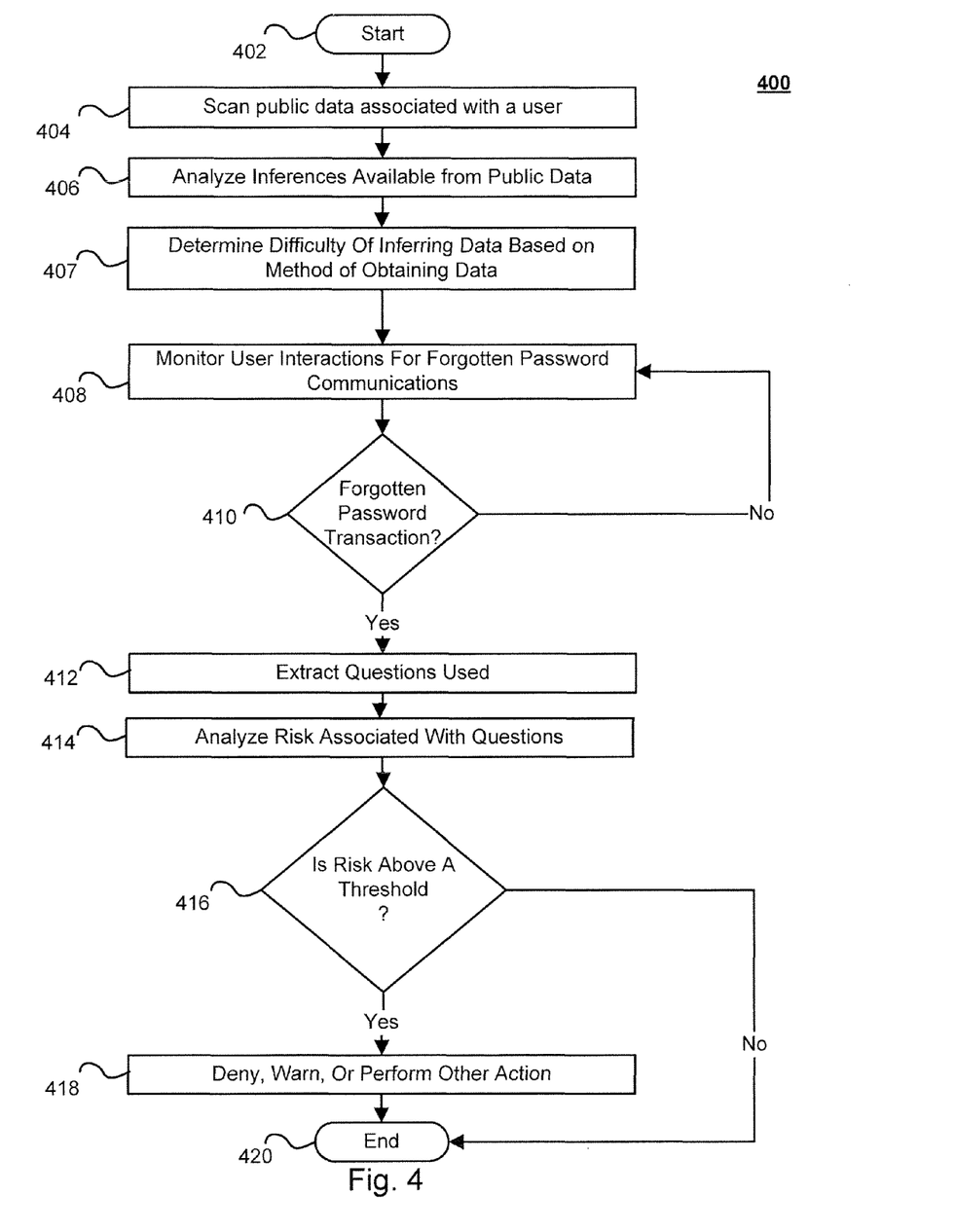
FIG. 4 depicts a method for mitigating forgotten password attacks in accordance with an embodiment of the present disclosure.

Referring to FIG. 4, there is depicted a method 400 for mitigating forgotten password attacks in accordance with an embodiment of the present disclosure. At block 402, the method 400 may begin.

At block 404, public data associated with a user may be scanned. According to some embodiments, a list of known social network sites may be provided by a security software vendor or another party. A list of used social media sites may also be provided by a user. According to some embodiments, a browser plug-in or toolbar may be used to track social media sites visited by a user. As described in relation to FIG. 3, public data monitoring module 312 of password inference management module 310 may be used to collect data from social media sites.

At block 406, inferences available from public data may be analyzed. As described in relation to FIG. 3, inference analysis module 314 of password inference management module 310 may be used to collect data from social media sites.

At block 407, the difficulty of inferring data may be determined based on the method of obtaining data. For example, an algorithm may be rated based on a difficulty of applying the algorithm, the frequency of use of the algorithm by hackers, and other factors. For example, information obtained via a complex algorithm requiring use of a social media application API to obtain information may be rated as more difficult to infer than information readily deduced from postings on a user social media site. The difficulty of inferring the data may be used to provide a stored weighted indication of the level of difficulty of the inference. This may be associated with the information.

At block 408, user interactions may be monitored for forgotten password communications. According to some embodiments, communications may be monitored from an account provider side. Forgotten password communications may include requests for password information, requests for a password reset, and additional security questions provided (e.g., in response to a failed login attempt, a login after a transaction above a specified amount, a login from a suspicious network location, etc.). As described in relation to FIG. 3, password transaction management module of password inference management module 310 may be used to monitor for a forgotten password transaction.

At block 410, if a forgotten password transaction is detected, the method 400 may continue at block 412. If a forgotten password transaction is not detected, the method 400 may return to block 408.

At block 412, one or more questions used in a forgotten password transaction may be extracted. A webpage or other communication from an account provider may be parsed and keywords or other data associated with a verification may be identified. According to some embodiments, parsing may occur at an agent, plug-in, or other component installed on an end user device. According to some embodiments, forgotten password transaction data may be forwarded to a third party (e.g., a security solutions provider) for parsing, extraction, and/or analysis.

At block 414 risk associated with one or more forgotten password questions may be analyzed. Analysis of risk may be based at least in part on the prevalence of public data used to identify and/or infer the answers to one or more forgotten password questions. Analysis of risk may be based at least in part on a difficulty of an inference to identify an answer to a password question (e.g., did it require collection of data from more than three users including the extraction of embedded metadata in multimedia or was it posted right on a user's publicly available profile). Analysis of a risk may provide an analysis of multiple security questions individually or as a combined score. For example, a password reset may require three questions (e.g., birthday, best man at user's wedding, and mother's maiden name). The security of each question may be rated individually and/or the risk of the reset based on the security of the three questions combined may be rated. According to some embodiments, the level of difficulty associated with information providing an answer (e.g., as determined in block 407) may be used to determine the risk. For example, a lower level of difficulty may correlate to a higher level of risk.

At block 416, it may be determined whether a risk is above a specified threshold. According to some embodiments, thresholds may be configurable based on one or more factors. For example, a user or security solution provider may require more secure questions for financial accounts than for access to a photo sharing site. A user or account provider may configure a threshold based on an account type, individual user criteria, transaction history, and other factors. If a risk is not above a specified threshold, the method 400 may end at block 420. According to some embodiments, indicia of the security question risk may be provided even if the risk is below a specified threshold. The indicia may provide a visual confirmation to a user that the risk of a password inference attack based on a listed security question has been analyzed. A rating of the risk may also be provided. If a risk is above a specified threshold, the method 400 may continue at block 418.

At block 418, a user, an account provider, or another entity may be warned, a password reset or request may be blocked, or another action may be taken. For example, if an additional or alternate forgotten password question may be requested. According to some embodiments, additional verification steps may be taken. For example, an account provider may require a user to contact them to provide verification information, or an account provider may send an email to a user requesting a confirmation.

At block 420, the method 400 may end.

At this point it should be noted that mitigating forgotten password attacks in accordance with the present disclosure as described above typically involves the processing of input data and the generation of output data to some extent. This input data processing and output data generation may be implemented in hardware or software. For example, specific electronic components may be employed in a password inference management module or similar or related circuitry for implementing the functions associated with mitigating forgotten password attacks in accordance with the present disclosure as described above. Alternatively, one or more processors operating in accordance with instructions may implement the functions associated with mitigating forgotten password attacks in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for mitigating forgotten password attacks comprising:
    collecting public data associated with a user;
    analyzing inferences available from the public data;
    receiving an indication of a forgotten password communication for the user;
    identifying, using at least one computer processor, verification information associated with the forgotten password communication;
    determining a level of difficulty of inferring the verification information based on public information associated with the user; and
    calculating a level of risk associated with the verification information; wherein the public data associated with the user is collected and inferences are analyzed prior to receiving an indication of a forgotten password communication for the user.

2. The method of claim 1, wherein the indication of a forgotten password communication comprises a communication received by an account provider and calculating a level of risk is performed by a system of at least one of: the account provider, a service provider, and a software vendor.

3. The method of claim 1, wherein the indication of a forgotten password communication comprises a communication received by the user and calculating a level of risk is performed by a system of at least one of: the user, a service provider, and a software vendor.

4. The method of claim 1, further comprising:
    determining whether a level of risk exceeds a specified threshold; and
    performing one or more actions in the event the level of risk exceeds a specified threshold.

5. The method of claim 4, wherein the one or more actions comprise at least one of: warning a user, warning an entity requesting verification information, providing a rating of the calculated level of risk, providing an indication of public information used for inferring the verification information, blocking a forgotten password transaction associated with the forgotten password communication, and providing a suggested alternate verification request with a lower level of risk.

6. The method of claim 1, wherein collecting public data comprises scanning social media sites associated with an account of the user to identify public data useful for inferring verification information.

7. The method of claim 6, wherein public data useful for inferring verification information includes at least one of: age, birthday, relationship to others, birthplace, education, gender, and anniversary date.

8. The method of claim 1, wherein collecting public data includes at least one of: comments by a user on a user's social media page, comments by others on a user's social media page, postings on a user's social media page, data shared by a user on their social media page, tags associated with multimedia on a user's social media page, and metadata embedded in multimedia on a user's social media page.

9. The method of claim 8, wherein metadata comprises at least one of: date information associated with the multimedia, time information associated with the multimedia, and geolocation data information associated with the multimedia.

10. The method of claim 1, wherein collecting public data comprises:
    identifying a relationship between the user and a second user; and
    collecting data associated with the user from a social media page associated with the second user.

11. The method of claim 1, wherein public data and inferences are stored in a database.

12. The method of claim 11, wherein the indication of a forgotten password communication comprises a communication received by a plug-in to a web enabled application of the user and wherein the plug-in accesses the database to determine the calculated level of risk associated with the verification information.

13. The method of claim 12, wherein the plug-in provides the calculated level of risk to the user allowing the user to select more secure forgotten password verification information.

14. The method of claim 12, wherein the plug-in provides an indication of public information used for inferring the verification information to the user.

15. The method of claim 1, further comprising:
    determining that the verification information has not been previously used for analyzing public information for inferences;
    collecting additional public data associated with the verification information;
    determining a difficulty of inferring the verification information based on additional public information associated with the user; and
    revising a calculated a level of risk associated with the verification information.

16. At least one non-transitory processor readable storage medium for storing a computer program of instructions configured to be readable by at least one processor for instructing the at least one processor to execute a computer process for performing the method as recited in claim 1.

17. An article of manufacture for mitigating forgotten password attacks, the article of manufacture comprising:

at least one non-transitory processor readable storage medium; and instructions stored on the at least one medium;

wherein the instructions are configured to be readable from the at least one medium by at least one processor and thereby cause the at least one processor to operate so as to:

collect public data associated with a user;

analyze inferences available from the public data;

receive an indication of a forgotten password communication for the user;

identify verification information associated with the forgotten password communication;

determine a level of difficulty of inferring the verification information based on public information associated with the user; and calculate a level of risk associated with the verification information; wherein the public data associated with the user is collected and inferences are analyzed prior to receiving an indication of a forgotten password communication for the user.

18. A system for mitigating forgotten password attacks comprising:

one or more processors communicatively coupled to a network; wherein the one or more processors are configured to:

collect public data associated with a user;

analyze inferences available from the public data;

receive an indication of a forgotten password communication for the user;

identify verification information associated with the forgotten password communication;

determine a level of difficulty of inferring the verification information based on public information associated with the user; and calculate a level of risk associated with the verification information; wherein the public data associated with the user is collected and inferences are analyzed prior to receiving an indication of a forgotten password communication for the user.

* * * * *